(12) United States Patent
Vemulapati et al.

(10) Patent No.: US 11,235,707 B2
(45) Date of Patent: Feb. 1, 2022

(54) VEHICLE STORAGE COMPARTMENT

(71) Applicant: Ford Global Technologies, LLC, Dearborn, MI (US)

(72) Inventors: Satyanarayana Raju Vemulapati, Westland, MI (US); Steven J. Antilla, Brighton, MI (US); Matthew Anthony Majkowski, Dearborn, MI (US); Brent Clifford Dalton, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 198 days.

(21) Appl. No.: 16/710,254

(22) Filed: Dec. 11, 2019

(65) Prior Publication Data
US 2021/0178975 A1   Jun. 17, 2021

(51) Int. Cl.
*B60R 7/04* (2006.01)

(52) U.S. Cl.
CPC ........... *B60R 7/04* (2013.01); *E05Y 2400/322* (2013.01)

(58) Field of Classification Search
CPC .................................................... B60R 7/04
USPC ...................................................... 296/37.8
See application file for complete search history.

(56) References Cited

U.S. PATENT DOCUMENTS

| | | | |
|---|---|---|---|
| 7,055,883 B2* | 6/2006 | Tokutomi | B60R 1/008 296/37.7 |
| 7,121,605 B2 | 10/2006 | DePue et al. | |
| 7,380,852 B2* | 6/2008 | Vander Kuyl | B60R 7/04 296/24.34 |
| 7,661,741 B2* | 2/2010 | Takai | B60R 7/082 296/37.1 |
| 9,566,912 B2* | 2/2017 | Shami | E05F 15/79 |
| 10,279,738 B1* | 5/2019 | Chen | B60R 7/04 |
| 10,953,800 B2* | 3/2021 | Vemulapati | G02B 5/10 |
| 2010/0238677 A1* | 9/2010 | de Laine | B60Q 3/82 362/520 |
| 2011/0199182 A1 | 8/2011 | Catlin | |
| 2012/0133169 A1* | 5/2012 | George | B60R 13/0206 296/1.08 |
| 2015/0353005 A1* | 12/2015 | Hodgson | B60Q 3/82 345/156 |

FOREIGN PATENT DOCUMENTS

| | | | | |
|---|---|---|---|---|
| DE | 102013014708 A1 | * | 3/2015 | ............ B60R 7/04 |
| DE | 102015008071 A1 | * | 2/2016 | ............ B60Q 3/02 |
| DE | 102017122345 A1 | * | 3/2018 | ............ B60R 7/04 |
| KR | 20040098292 A | * | 11/2004 | ............ B60R 7/04 |

* cited by examiner

*Primary Examiner* — Jason S Morrow
(74) *Attorney, Agent, or Firm* — David Coppiellie; Price Heneveld LLP (57) ABSTRACT

A storage compartment for the vehicle is disclosed herein. The storage compartment includes a receptacle. A door is coupled to the receptacle and is operable between an open position and a closed position. A sensors coupled to the door and is configured to sense a user input. An actuator is configured to allow the door to move from the closed position to the open position in response to the sensor, sensing the user input, wherein the actuator is electrically coupled to the sensor when the door is in the closed position and is electrically disconnected from the sensor, when the door is in the open position.

20 Claims, 5 Drawing Sheets

VEHICLE STORAGE COMPARTMENT

FIELD OF THE DISCLOSURE

The present disclosure generally relates to a storage compartment for a vehicle. More specifically, the present disclosure relates to a storage compartment for a vehicle that includes a door having a sensor.

BACKGROUND OF THE DISCLOSURE

Vehicles often include storage compartments throughout the vehicle interiors. User-friendly mechanisms for opening and closing the storage compartments may be desired.

SUMMARY OF THE DISCLOSURE

According to a first aspect of the present disclosure, a storage compartment for a vehicle includes a receptacle. A door is coupled to the receptacle and is operable between an open position and a closed position. A sensor is coupled to the door and configured to sense a user input. An actuator is configured to allow the door to move from the closed position to the open position in response to the sensor sensing the user input. The actuator is electrically coupled to the sensor when the door is in the closed position and is electrically disconnected from the sensor when the door is in the open position.

Embodiments relating to the first aspect of the present disclosure may include any one or combination of the following features:
  a decorative trim component coupled to an outer surface of the door, wherein the sensor is integrated with the decorative trim component, such that the sensor is configured to sense the user input when a user touches the decorative trim component;
  the sensor is a capacitive sensor;
  the storage compartment is disposed within an overhead console of the vehicle, and the door is configured to open via pivotal movement about a pivot axis that extends in a vehicle-direction;
  the decorative trim component protrudes outward from the outer surface of the door and is elongated in a vehicle-direction generally parallel to the vehicle-direction that the pivot axis extends;
  the decorative trim component is at least partially comprised of chrome;
  a first electrical contact coupled to the sensor and a second electrical contact coupled to the actuator and configured to be in contact with the first electrical contact when the door in the closed position;
  the door is configured to pivot about a pivot axis from the closed position to the open position, wherein the pivot axis is disposed generally between the first electrical contact and the decorative trim component; and
  the second electrical contact comprises a pogo pin.

According to a second aspect of the present disclosure, a storage compartment for a vehicle includes a receptacle. A door is coupled to the receptacle and is operable between an open position and a closed position. The door includes inner and outer surfaces, wherein the outer surface is further from the receptacle than the inner surface when the door is in the closed position. A decorative trim component is coupled to the outer surface of the door. A capacitive sensor for sensing a user input is operably coupled with the decorative trim component, such that the capacitive sensor is configured to sense the user input when a user touches a portion of the decorative trim component. An actuator is configured to allow the door to move from the closed position to the open position in response to the capacitive sensor sensing the user input.

Embodiments relating to the second aspect of the present disclosure may include any one or combination of the following features:
  the storage compartment is disposed within an overhead console of the vehicle, and the door is configured to open via pivotal movement about a pivot axis that extends in a vehicle-direction;
  the decorative trim component protrudes outward from the outer surface of the door and is elongated in a vehicle-direction generally parallel to the vehicle-direction that the pivot axis extends;
  the decorative trim component is at least partially comprised of chrome; and
  the actuator is conductively connected to the sensor when the door is in the closed position and is conductively disconnected from the sensor when the door is in the open position.

According to a third aspect of the present disclosure, an overhead console for a vehicle includes a storage compartment. The storage compartment includes a receptacle. A door is coupled to the receptacle and is operable between an open position and a closed position. The door includes inner and outer surfaces, wherein the outer surface is further from the receptacle than the inner surface when the door is in the closed position. A decorative trim component is coupled to the outer surface of the door. A sensor for sensing a user input is operably coupled with the decorative trim component, such that the sensor is configured to sense the user input when a user touches a portion of the decorative trim component. An actuator is configured to allow the door to move from the closed position to the open position in response to the sensor sensing the user input. The actuator is conductively connected to the sensor when the door is in the closed position and is conductively disconnected from the sensor when the door is in the open position.

Embodiments relating to the third aspect of the present disclosure may include any one or combination of the following features:
  the door is configured to open via pivotal movement about a pivot axis that extends in a vehicle-direction;
  the decorative trim component protrudes outward from the outer surface of the door and is elongated in a vehicle-direction generally parallel to the vehicle-direction that the pivot axis extends;
  the decorative trim to component is at least partially comprised of chrome;
  a first electrical contact is coupled with the sensor, and a second electrical contact is coupled to the actuator and configured to be in contact with the first electrical contact when the door is in the closed position; and
  the pivot axis is disposed generally between the first electrical contact and the decorative trim component.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, an overhead console 14 for a vehicle 10 includes a storage compartment 18. The storage compartment 18 includes a receptacle 22. A door 26 is coupled to the receptacle 22 and is operable between an open position and a closed position. The door 26 includes an inner surface 26A and an outer surface 26B, wherein the outer surface 26B is further from the receptacle 22 than the inner surface 26A when the door 26 is in the closed position. A decorative trim component 34 is coupled to the outer surface 26B of the door 26. A sensor 36 for sensing a user input is operably coupled with the decorative trim component 34, such that the sensor 36 is configured to sense the user input when a user touches a portion of the decorative trim component 34. An actuator 42 is configured to allow the door 26 to move from the closed position to the open position in response to the sensor 36, sensing the user input. The actuator 42 is conductively connected to the sensor 36 when the door 26 is in the closed position and is conductively disconnected from the sensor 36 when the door 26 is in the open position.

Figure 1:
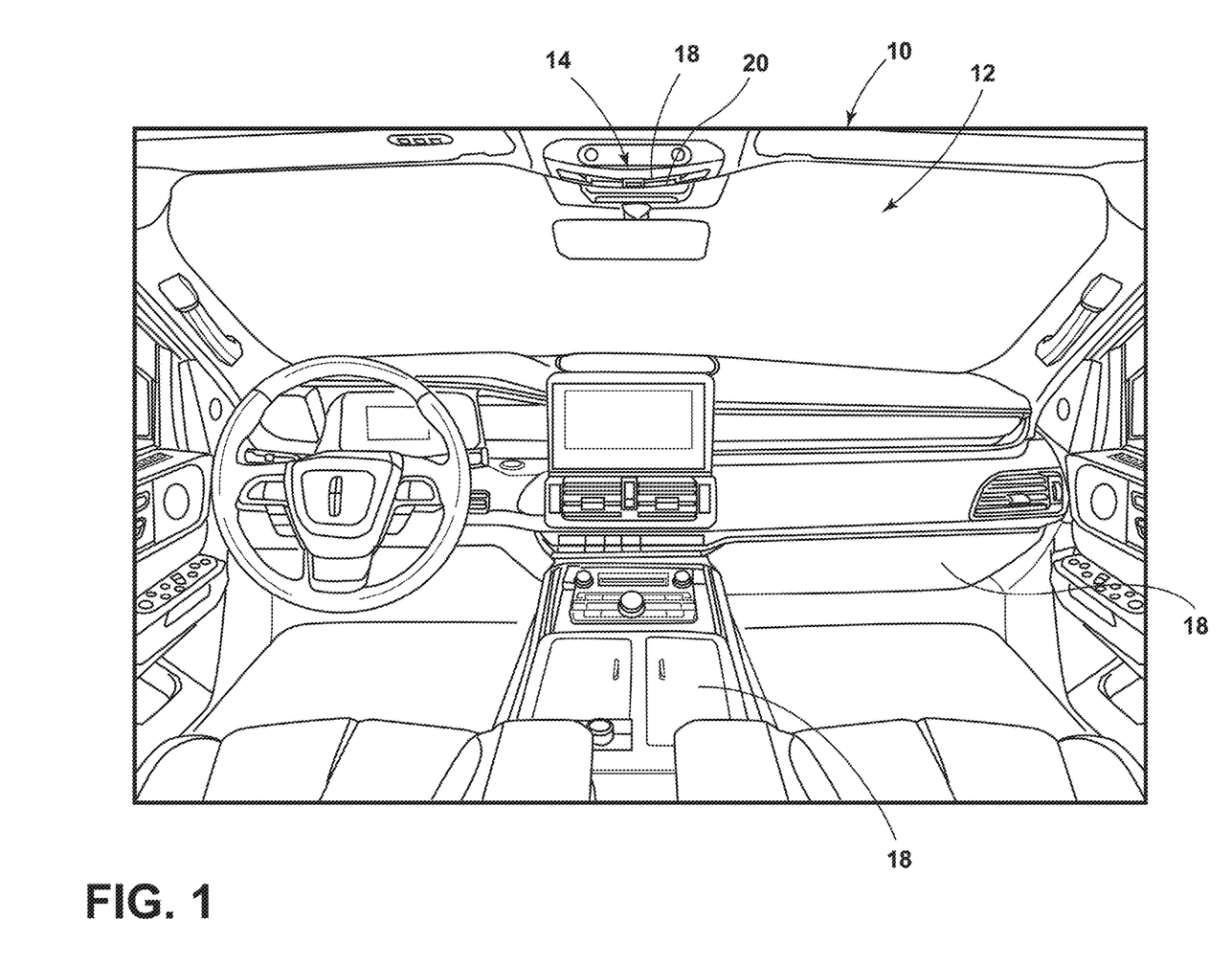
FIG. 1 is a perspective view of an interior of a vehicle, illustrating a storage compartment within the vehicle interior, according to one embodiment.

Referring now to FIG. 1, in various embodiments, the vehicle 10 may include a vehicle interior 12. The vehicle interior 12 may include a variety of vehicle components (e.g., a dashboard, a center console, seating assemblies, etc.). In some embodiments, the vehicle interior 12 may include the overhead console 14, as shown in FIG. 1.

Referring now to FIGS. 1-3B, in various embodiments, the vehicle interior 12 may include the storage compartment 18. The storage compartment 18 may be configured for storing an object and may be disposed in, or coupled to, various vehicle components (e.g., a dashboard, a center counsel, etc.). In some embodiments, the storage compartment 18 may be disposed within the overhead console 14 of the vehicle 10. For example, as shown in FIGS. 2A-3B, in some embodiments, the storage compartment 18 may be a sunglasses bin 20 disposed within the overhead console 14.

In further reference to FIGS. 2A-3B, in various embodiments, the storage compartment 18 may include a receptacle 22. The receptacle 22 may be configured to hold an object. The storage compartment 18 may also include a door 26. The door 26 may be operable between an open position and a closed position. In various embodiments, the receptacle 22 may be generally exposed to a vehicle occupant when the door 26 is in the open position. As such, in some embodiments, the vehicle occupant may be able to access the receptacle 22 to put an object into the receptacle 22 or take an object out of the receptacle 22, when the door 26 is in the open position. Further, in various embodiments, the receptacle 22 may be hidden from and/or may be generally inaccessible to the vehicle occupant when the door 26 is in the closed position.

Figure 4:
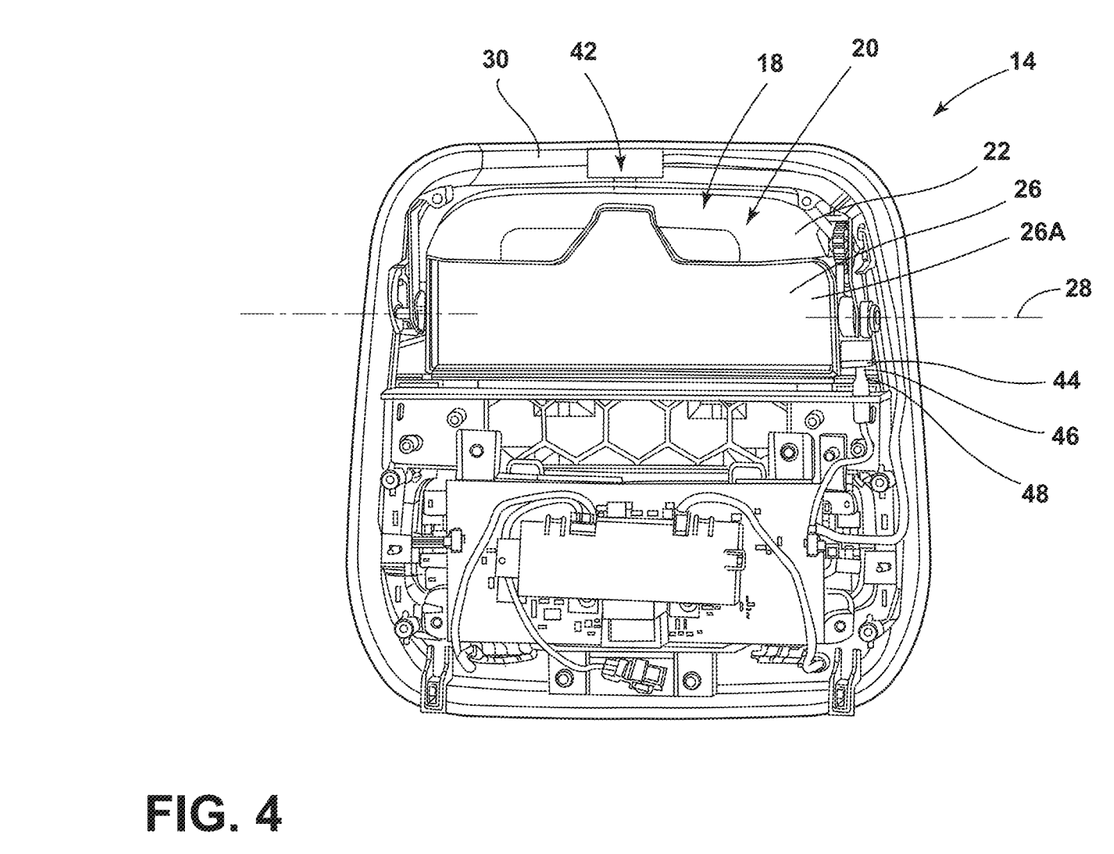
FIG. 4 is a rear view of the overhead console of the vehicle, illustrating the door of the storage compartment in the closed position and the sensor conductively connected with the actuator, according to one embodiment.

In some embodiments, the door 26 may be configured to open via pivotal movement about a pivot axis 28. In various embodiments, the pivot axis 28 may extend in at least one of a variety of vehicle-directions (e.g., vehicle-forward, vehicle-rearward, etc.). In some embodiments, the pivot axis 28 may extend generally, substantially, majorly, and/or entirely vehicle-laterally. For example, as shown in FIG. 4, the pivot axis 28 may extend generally laterally through the overhead console 14, which may be oriented within the vehicle interior 12 such that the pivot axis 28 also extends generally laterally relative to the vehicle 10.

Figure 2A:
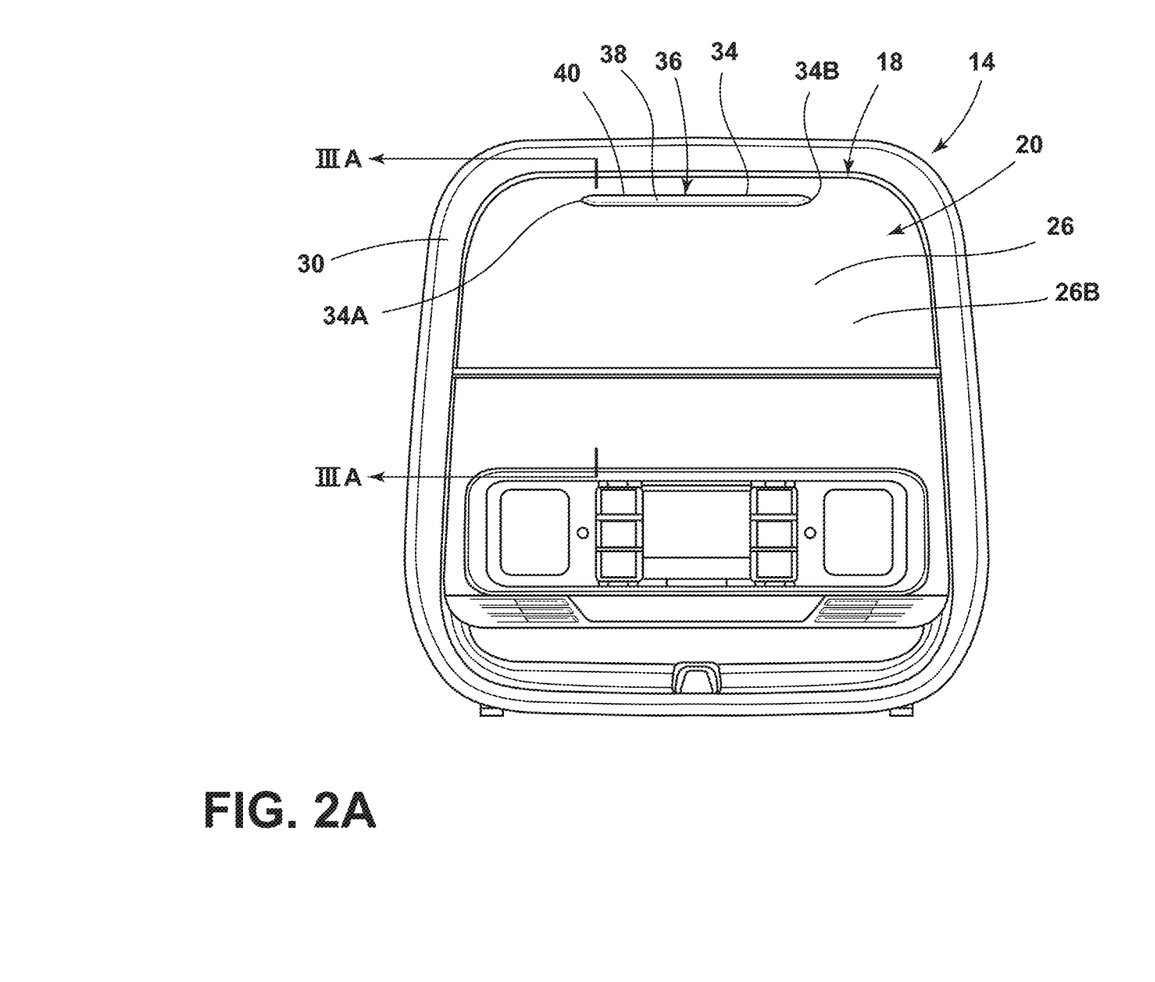
FIG. 2A is a frontal view of an overhead console of the vehicle, illustrating a door of the storage compartment in a closed position, according to one embodiment.
Figure 2B:
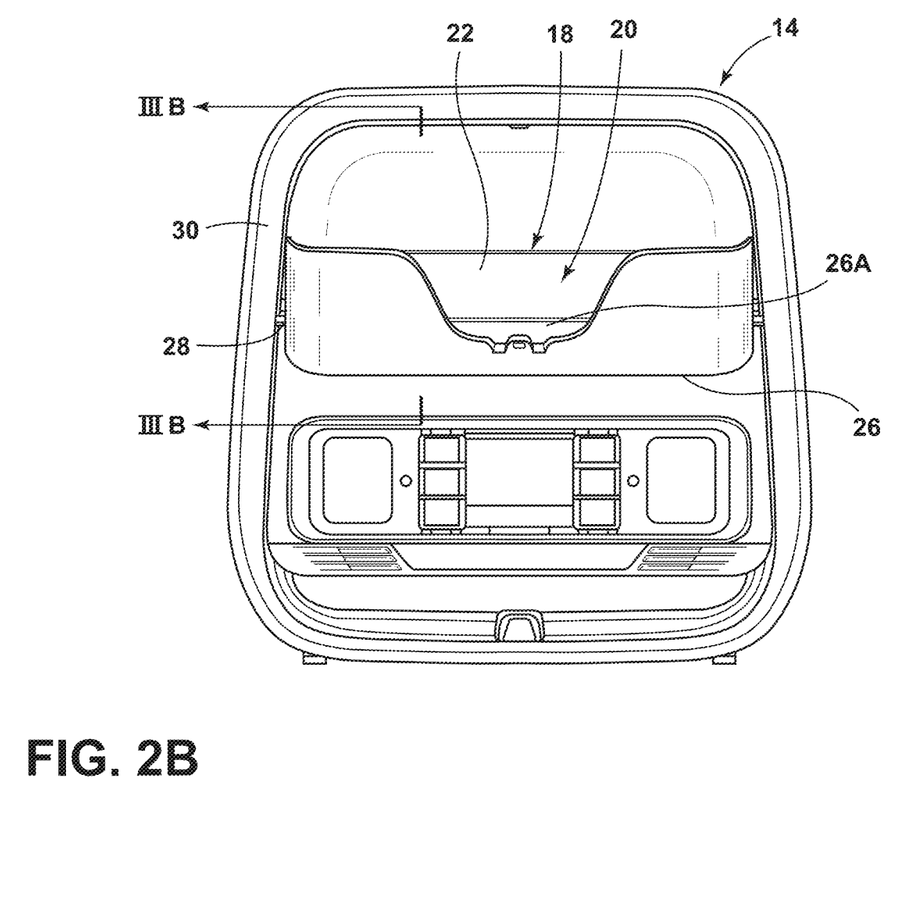
FIG. 2B is a frontal view of the overhead console of the vehicle, illustrating the door of the storage compartment in an open position, according to one embodiment.
Figure 3A:
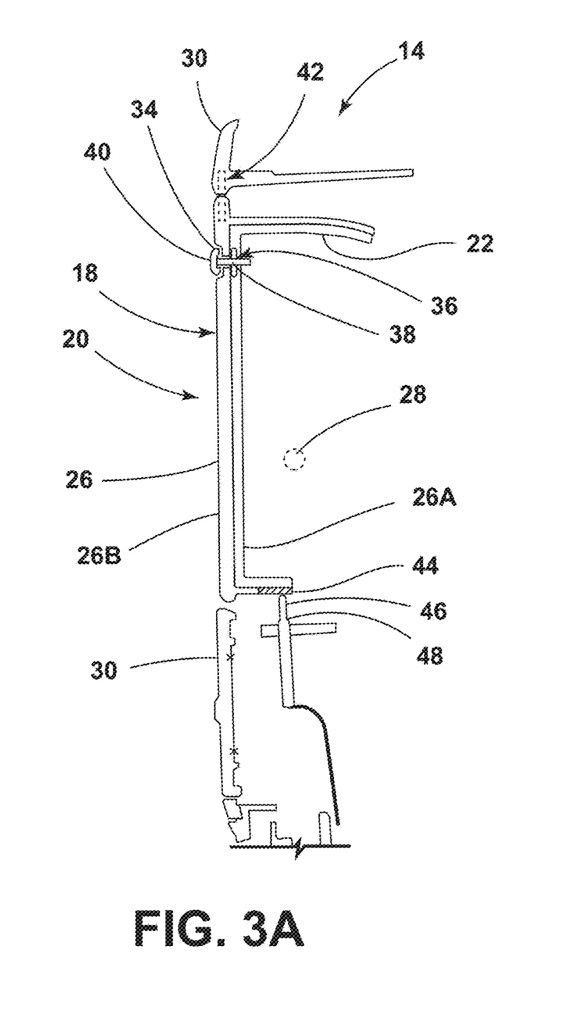
FIG. 3A is a cross-sectional view of the overhead console of the vehicle taken through line by IIIA-IIIA of FIG. 2A, illustrating the door of the storage compartment in the closed position and a sensor positioned on the door conductively connected with an actuator, according to one embodiment.
Figure 3B:
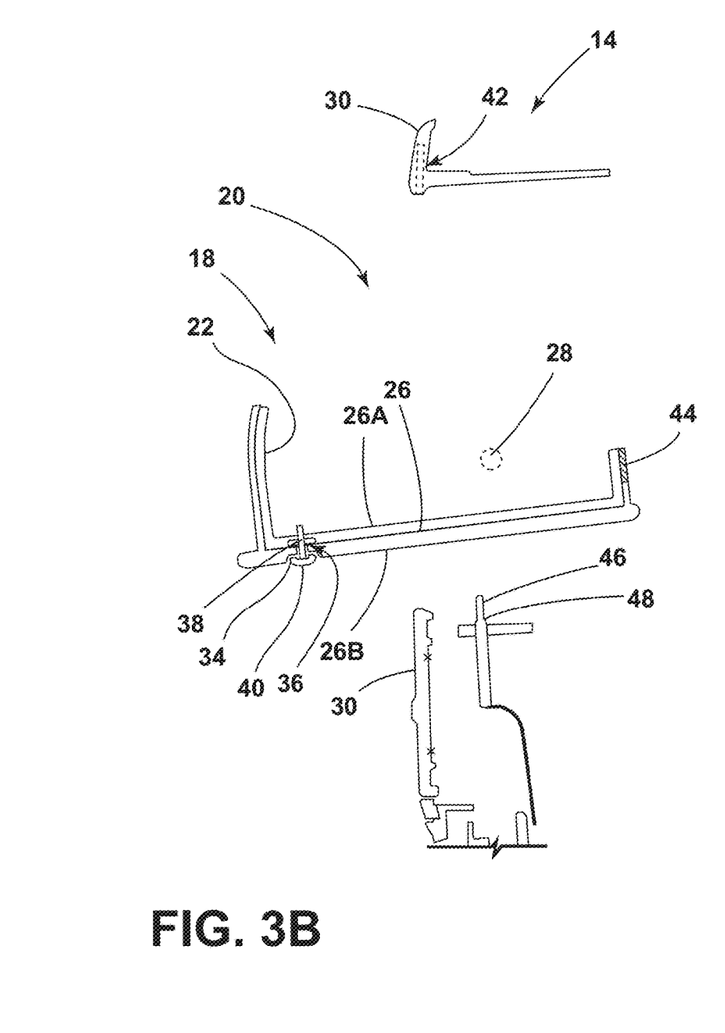
FIG. 3B is a cross-sectional view of the overhead console of the vehicle taken through line IIIB-IIIB of FIG. 2B, illustrating the door of the storage compartment in the open position and the sensor positioned on the door conductively disconnected from the actuator, according to one embodiment.

In various embodiments, the door 26 of the storage compartment 18 may pivot relative to the receptacle 22 as the door 26 moves between the open position and the closed position. In some embodiments, the door 26 may remain generally static relative to the receptacle 22 as the door 26 moves between the open position and the closed position. For example, the door 26 of the sunglasses bin 20, illustrated in FIGS. 2A-4, is generally fixedly coupled to the receptacle 22 of the sunglasses bin 20. Thus, the receptacle 22 and the door 26 remain generally static relative to one another as the door 26 moves from the closed position, as shown in FIGS. 2A and 3A, to the open position, as shown in FIGS. 2B and 3B. In such embodiments, the door 26 and the receptacle 22 may move relative to a trim surround 30 of the overhead console 14 when the door 26 is pivoted from the closed position to the open position.

In reference to FIGS. 2A-4, in various embodiments, the door 26 may include the inner surface 26A and the outer surface 26B. In some embodiments, the outer surface 26B may be further from the receptacle 22 than the inner surface 26A when the door 26 is in the closed position. In some embodiments, the outer surface 26B may be farther from the receptacle 22 than the inner surface 26A when the door 26 is in the open position. In some embodiments, the outer surface 26B may be farther from the receptacle 22 than the inner surface 26A when the door 26 is in the closed position and when the door 26 is in the open position. As shown in FIGS. 2A and 3A, in some embodiments, the outer surface 26B may be generally planar with the trim surround 30 of the overhead console 14 when the door 26 is in the closed position.

Referring now to FIGS. 2A-3B, in various embodiments, the storage compartment 18 may include the decorative trim component 34. The decorative trim component 34 may be coupled to the door 26. In some embodiments, the decorative trim component 34 may be coupled to the outer surface 26B of the door 26. In some embodiments, the decorative trim component 34 may protrude outward from the outer surface 26B of the door 26. In other words, in some embodiments, the decorative trim component 34 may extend outward from the outer surface 26B of the door 26 in a direction generally away from the inner surface 26A of the door 26, as shown in FIGS. 3A and 3B. It is contemplated that, in some embodiments, the decorative trim component 34 may be generally flat relative to the outer surface 26B of the door 26 or even a depression in the outer surface 26B of the door 26.

Referring now to FIG. 2A, in some embodiments, the decorative trim component 34 may be elongated in at least one of a variety of vehicle-directions. In other words, in some embodiments, the decorative trim component 34 may extend along the outer surface 26B of the door 26 in a vehicle-direction from a first end 34A to a second end 34B, such that the decorative trim component 34 is elongated in shape between the first end 34A and the second end 34B. In some embodiments, the vehicle-direction that the decorative trim component 34 is elongated in may be generally, substantially, majorly, and/or entirely parallel to the vehicle-direction that the pivot axis 28 extends. For example, as discussed above, in some embodiments, the pivot axis 28 may extend generally vehicle-laterally; accordingly, the decorative trim component 34 may also extend generally vehicle-laterally. It is contemplated that, in various embodiments, the decorative trim component 34 may be at least one of a variety of shapes. Further, in various embodiments, the decorative trim component 34 may be made of one or more of a variety of materials. In some embodiments, the decorative trim component 34 may be formed of an electrically conductive material (e.g., aluminum). For example, in some embodiments, the decorative trim component 34 may be made at least partially of chrome.

In reference to FIGS. 2A-3A, in various embodiments, the storage compartment 18 may include the sensor 36. The sensor 36 may be configured to sense a user input, in various embodiments. In some embodiments, the sensor 36 may be coupled to the door 26. In some embodiments, the sensor 36 may be coupled to the outer surface 26B of the door 26. It is contemplated that, in various embodiments, the sensor 36 may be at least one of a variety of types of sensors (e.g., pressure sensor, proximity sensor, capacitive sensor, mechanical sensor, motion sensor, etc.). In some embodiments, the sensor 36 may include a capacitive sensor 38. The capacitive sensor 38 may generally be configured to receive a user input by sensing a touch from the vehicle occupant upon the capacitive sensor 38.

Referring now to FIGS. 2A, 3A, and 3B, in some embodiments, the sensor 36 may be integrated with the decorative trim component 34. In various embodiments, the sensor 36 may be integrated with the decorative trim component 34, such that the sensor 36 is configured to sense a user input when a user touches the decorative trim component 34, such as in an embodiment in which the sensor 36 includes the capacitive sensor 38. In some embodiments, in which the sensor 36 includes the capacitive sensor 38, the capacitive sensor 38 may be integrated with and/or operably coupled with the decorative trim component 34, such that the capacitive sensor 38 is configured to sense a user input when a user touches a portion of the decorative trim component 34. In some embodiments, in which the decorative trim component 34 is formed of a conductive material (e.g., chrome, aluminum, etc.), the decorative trim component 34 may form one or more electrodes utilized in the capacitive sensor 38 to provide capacitance, which may produce a sense activation field. Changes to the sense activation field of the capacitive sensor 38 may be caused by a vehicle occupant touching the decorative trim component 34, and this change in the activation field may be compared against a threshold to determine when a user input to the capacitive sensor 38 has occurred. It is contemplated that, in various embodiments, the capacitive sensor 38 may be configured in at least one of a variety of other arrangements. Further, it is contemplated that, in various embodiments, the sensor 36 and/or the capacitive sensor 38 may be coupled to and/or operate in tandem with a controller.

Referring now to FIGS. 3A-4, in various embodiments, the storage compartment 18 may include the actuator 42. In various embodiments, the actuator 42 may be configured to allow movement of the door 26 between the closed and open positions in response to the sensor 36 sensing a user input. In some embodiments, the actuator 42 may allow the door 26 to be moved between the open and closed positions by forces other than the actuator 42, in response to the sensor 36 sensing a user input. In other words, in some embodiments, the actuator 42 may be configured to initially maintain the door 26 in the closed position, but in response to the sensor 36 sensing a user input, the actuator 42 may actuate to release the door 26, such that the door 26 may move from the closed position to the open position. For example, as shown in FIGS. 3A and 3B, the door 26 of the sunglasses bin 20 may be generally biased toward the open position, while held in the closed position by the actuator 42. Actuation of the actuator 42, pursuant to a user input being sensed by the sensor 36, may release the door 26, which may allow the door 26 to move from the closed position to the open position via the now unimpeded bias being exerted upon the door 26 toward the open position. It is contemplated that, in various embodiments, the actuator 42 may allow movement of the door 26 between the open position and the closed position in a variety of ways. In some embodiments, the actuator 42 may actively move the door 26 between the open and closed positions. For example, in some embodiments, actuation of the actuator 42 may physically cause the door 26 to move from the closed position to the open position. Likewise, in some embodiments, actuation of the actuator 42 may physically cause the door 26 to move from the open position to the closed position.

In various embodiments, the actuator 42 may include one or more of a variety of components and/or features that are configured to allow movement of the door 26. Further, in various embodiments, the actuator 42 may include both motorized and non-motorized components. For example, in some embodiments, the actuator 42 may include a non-motorized pawl mechanism that directly engages with the door 26 of the storage compartment 18, and a motorized solenoid spring configured to thrust a plunger into a receiving portion of the non-motorized pawl mechanism, which causes a latch of the non-motorized pawl mechanism to disengage from the door 26, allowing the door 26 to move from the closed position to the open position.

Referring still to FIGS. 3A-4, in various embodiments, the actuator 42 may be electrically coupled to the sensor 36 when the door 26 is in the closed position and may be electrically disconnected from the sensor 26 when the door 26 is in the open position. In other words, the actuator 42 may be electrically isolated from the sensor 36 when the door 26 is in the open position. In some embodiments, the actuator 42 may be electrically coupled to the sensor 36 by being conductively connected to the sensor 36 when the door 26 is in the closed position and may be electrically disconnected from the sensor 36 by being conductively disconnected from the sensor 36 when the door 26 is in the open position. For example, in some embodiments, the sensor 36 may be coupled with a first electrical contact 44 (e.g., via one or more wires) that is positioned on the door 26, such that current may run between the sensor 36 and the first electrical contact 44. Further, the actuator 42 may be coupled with the second electrical contact 46 (e.g., via one or more wires), such that current may run between the actuator 42 and the second electrical contact 46. As shown in FIGS. 3A and 4, the second electrical contact 46 may be configured to be in contact with the first electrical contact 44 end of the door 26 is in the closed position. The contact between the first and second electrical contacts 44, 46 may conductively connect the sensor 36 with the actuator 42 when the door 26 is in the closed position. As shown in FIG. 3B, movement of the door 26 from the closed position to the open position may break the contact between the first and second electrical contacts 44, 46. The separation between the first and second electrical contacts 44, 46 may result in the sensor 36 and the actuator 42 being conductively disconnected from one another. In other words, separation between the first and second electrical contacts 44, 46 may inhibit and/or prevent current from flowing between the sensor 36 and the actuator 42.

As illustrated in FIGS. 3A-4, in some embodiments, the second electrical contact 46 may include a pogo pin 48. The pogo pin 48 may be spring-loaded and may be configured to yield when contacted by the first electrical contact 44 as the door 26 moves from the open position to the closed position. It is contemplated that, in some embodiments, the sensor 36 may remain conductively connected with the actuator 42, irrespective of whether the door 26 is in the open or closed position.

In operation of a non-limiting embodiment of the present disclosure, a vehicle occupant desires to store sunglasses within the sunglasses bin 20 storage compartment 18 disposed within the overhead console 14 of the vehicle 10. Accordingly, the vehicle occupant touches a portion of the chrome decorative trim component 34 disposed on the outer surface 26B of the door 26 of the sunglasses bin 20. The vehicle occupant's touch is sensed by the capacitive sensor 38 integrated with the decorative trim component 34. The sensed touch triggers the actuator 42 to actuate. The actuation of the actuator 42 allows the door 26 to pivot relative to the trim surround 30 of the overhead console 14 from the closed position to the open position. As the door 26 pivots toward the open position, the first electrical contact 44 coupled to the capacitive sensor 38 within the door 26 is separated from the second electrical contact 46, which is coupled to the actuator 42. As such, the capacitive sensor 38 and the actuator 42 become conductively disconnected as the door 26 moves to the open position. Having opened the sunglasses bin 20, the vehicle occupant stores the sunglasses within the now exposed receptacle 22, and manually pivots the door 26 of the sunglasses bin 20 storage compartment 18 back from the open position to the closed position. As the door 26 is closed, the first electrical contact 44 comes into physical contact with the second electrical contact 46 once more, such that the capacitive sensor 38 and the actuator 42 are conductively connected again.

The present disclosure may provide a variety of advantages. First, the ability to open the door 26 of the storage compartment 18 by simply touching the sensor 36 coupled to the outer surface 26B of the door 26 of the storage compartment 18 may be convenient for the vehicle occupant. Second, integrating the sensor 36 into the decorative trim component 34 on the outer surface 26B of the door 26 of the storage compartment 18 may make the storage compartment 18 both functional and aesthetically appealing. Third, the sensor 36 being conductively connected with the actuator 42 while the door 26 is in the closed position, and conductively disconnected from the actuator 42 when the door 26 is in the open position, may allow for a simplified manufacturing process of the storage compartment 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A storage compartment for a vehicle, comprising:
a receptacle;
a door coupled to the receptacle and operable between an open position and a closed position;
a sensor coupled to the door and configured to sense a user input; and
an actuator configured to allow the door to move from the closed position to the open position in response to the sensor sensing the user input, wherein the actuator is electrically coupled to the sensor when the door is in the closed position and is electrically disconnected from the sensor when the door is in the open position.

2. The storage compartment of claim 1, further comprising:
a decorative trim component coupled to an outer surface of the door, wherein the sensor is integrated with the decorative trim component, such that the sensor is configured to sense the user input when a user touches the decorative trim component.

3. The storage compartment of claim 2, wherein the sensor is a capacitive sensor.

4. The storage compartment of claim 3, wherein the storage compartment is disposed within an overhead console of the vehicle, and the door is configured to open via pivotal movement about a pivot axis that extends in a vehicle-direction.

5. The storage compartment of claim 4, wherein the decorative trim component protrudes outward from the outer surface of the door and is elongated in a vehicle-direction generally parallel to the vehicle-direction that the pivot axis extends.

6. The storage compartment of claim 5, wherein the decorative trim component is at least partially comprised of chrome.

7. The storage compartment of claim 2, further comprising:
a first electrical contact coupled to the sensor; and
a second electrical contact coupled to the actuator and configured to be in contact with the first electrical contact when the door is in the closed position.

8. The storage compartment of claim 7, wherein the door is configured to pivot about a pivot axis from the closed position to the open position, wherein the pivot axis is disposed generally between the first electrical contact and the decorative trim component.

9. The storage compartment of claim 8, wherein the second electrical contact comprises:
a pogo pin.

10. A storage compartment for a vehicle, comprising:
a receptacle;
a door coupled to the receptacle and operable between an open position and a closed position, the door having inner and outer surfaces, wherein the outer surface is further from the receptacle than the inner surface when the door is in the closed position;
a decorative trim component coupled to the outer surface of the door;
a capacitive sensor for sensing a user input operably coupled with the decorative trim component, such that the capacitive sensor is configured to sense the user input when a user touches a portion of the decorative trim component; and
an actuator configured to allow the door to move from the closed position to the open position in response to the capacitive sensor sensing the user input.

11. The storage compartment of claim 10, wherein the storage compartment is disposed within an overhead console of the vehicle, and the door is configured to open via pivotal movement about a pivot axis that extends in a vehicle-direction.

12. The storage compartment of claim 11, wherein the decorative trim component protrudes outward from the outer surface of the door and is elongated in a vehicle-direction generally parallel to the vehicle-direction that the pivot axis extends.

13. The storage compartment of claim 12, wherein the decorative trim component is at least partially comprised of chrome.

14. The storage compartment of claim 10, wherein the actuator is conductively connected to the sensor when the door is in the closed position and is conductively disconnected from the sensor when the door is in the open position.

15. An overhead console for a vehicle, comprising:
a storage compartment, comprising:
a receptacle;
a door coupled to the receptacle and operable between an open position and a closed position, the door having inner and outer surfaces, wherein the outer surface is further from the receptacle than the inner surface when the door is in the closed position;
a decorative trim component coupled to the outer surface of the door;
a sensor for sensing a user input operably coupled with the decorative trim component, such that the sensor is configured to sense the user input when a user touches a portion of the decorative trim component; and
an actuator configured to allow the door to move from the closed position to the open position in response to the sensor sensing the user input, wherein the actuator is conductively connected to the sensor when the door is in the closed position and is conductively disconnected from the sensor when the door is in the open position.

16. The overhead console of claim 15, wherein the door is configured to open via pivotal movement about a pivot axis that extends in a vehicle-direction.

17. The overhead console of claim 16, wherein the decorative trim component protrudes outward from the outer surface of the door and is elongated in a vehicle-direction generally parallel to the vehicle-direction that the pivot axis extends.

18. The overhead console of claim 17, wherein the decorative trim component is at least partially comprised of chrome.

19. The overhead console of claim 16, further comprising:
a first electrical contact coupled to the sensor; and
a second electrical contact coupled to the actuator and configured to be in contact with the first electrical contact when the door is in the closed position.

20. The overhead console of claim 19, wherein the pivot axis is disposed generally between the first electrical contact and the decorative trim component.

* * * * *